(12) United States Patent
Wingett

(10) Patent No.: US 8,167,458 B2
(45) Date of Patent: May 1, 2012

(54) MULTI COLOURS DEVICE ILLUMINATION

(75) Inventor: Gary Wingett, Southampton (GB)

(73) Assignee: Core Wireless Licensing S.a.r.l., Luxembourg (LU)

( * ) Notice: Subject to any disclaimer, the term of this patent is extended or adjusted under 35 U.S.C. 154(b) by 882 days.

(21) Appl. No.: 11/631,205

(22) PCT Filed: Jun. 28, 2005

(86) PCT No.: PCT/IB2005/002085
§ 371 (c)(1),
(2), (4) Date: Sep. 4, 2008

(87) PCT Pub. No.: WO2006/003510
PCT Pub. Date: Jan. 12, 2006

(65) Prior Publication Data
US 2009/0042621 A1      Feb. 12, 2009

(30) Foreign Application Priority Data

Jun. 30, 2004   (GB) .................... 0414670.0

(51) Int. Cl.
*F21V 33/00*      (2006.01)
(52) U.S. Cl. .................. 362/293; 362/311.02; 362/800; 362/249.02
(58) Field of Classification Search .................. 362/293, 362/249.02, 311.02, 800
See application file for complete search history.

(56) References Cited

U.S. PATENT DOCUMENTS

| | | | | |
|---|---|---|---|---|
| 3,706,968 A | * | 12/1972 | Turner, Jr. ...................... | 340/982 |
| 4,096,552 A | * | 6/1978 | Ben-Porat ...................... | 362/104 |
| 6,786,617 B2 | * | 9/2004 | Lemay et al. ................. | 362/230 |
| 2002/0039914 A1 | | 4/2002 | Hama et al. | |
| 2003/0044000 A1 | | 3/2003 | Kfoury et al. | |
| 2003/0100332 A1 | | 5/2003 | Engstrom et al. | |
| 2003/0189211 A1 | | 10/2003 | Dietz | |
| 2004/0022047 A1 | | 2/2004 | Okayasu | |
| 2004/0119601 A1 | | 6/2004 | Colorado et al. | |
| 2005/0062446 A1 | * | 3/2005 | Ashdown ....................... | 315/324 |
| 2007/0047215 A1 | * | 3/2007 | Egami et al. .................... | 362/29 |

FOREIGN PATENT DOCUMENTS

| | | |
|---|---|---|
| CN | 104825 A | 3/2004 |
| DE | 3901289 | 7/1990 |
| DE | 19855005 | 5/2000 |
| EP | 0 901 262 A2 | 3/1999 |
| EP | 1 139 639 A2 | 10/2001 |
| EP | 1 170 930 A1 | 1/2002 |
| EP | A-1 223 727 | 7/2002 |
| EP | 1 324 578 A2 | 7/2003 |
| EP | A-1 333 226 | 8/2003 |
| EP | 1 414 222 A2 | 4/2004 |

(Continued)

OTHER PUBLICATIONS

International Search Report of International Application No. PCT/IB2005/002085—Date of Completion of Search—Oct. 7, 2005.

(Continued)

*Primary Examiner* — Laura Tso

(57) ABSTRACT

A portable device having within it a multicolour illumination arrangement comprising: a surface; a plurality of light sources, at least one of the plurality of light sources being capable of generating two or more emission colors; and drive means for causing the emission color of the at least one light source to vary; whereby the illumination arrangement can produce a varying illumination through at least part of the surface.

38 Claims, 1 Drawing Sheet

FOREIGN PATENT DOCUMENTS

| | | |
|---|---|---|
| GB | A-1 391 925 | 4/1975 |
| GB | 2327315 | 1/1999 |
| JP | 2001-103141 | 4/2001 |
| JP | 2002-271461 | 9/2002 |

OTHER PUBLICATIONS

Search Report of United Kingdom Application No. GB0414670.0, Date of Search—Nov. 10, 2004.

* cited by examiner

MULTI COLOURS DEVICE ILLUMINATION

FIELD OF THE INVENTION

The present invention relates to the illumination of devices, and in particular but not exclusively to the illumination of portable devices such as mobile communications handsets and personal digital assistants.

BACKGROUND OF THE INVENTION

The field of portable devices is a competitive one and it is generally desirable for manufacturers to produce designs that are both aesthetically appealing and user-friendly. Mobile communications handsets are known which include multicolour displays, illumination effects within the casing of the handset, or multicolour plastic casings. In order to make a portable device distinctive it would be desirable to produce such a device having an illumination arrangement significantly different from previously known devices, and preferably having an illumination arrangement capable of improving the user-friendliness of the device.

STATEMENT OF THE INVENTION

According to a first aspect of the present invention there is provided a portable device having within it a multicolour illumination arrangement comprising: a casing; a plurality of light sources, at least one of the plurality of light sources being capable of generating two or more emission colours; and drive means for causing the emission colour of the at least one light source to vary; whereby the illumination arrangement can produce a varying illumination through at least part of the casing the illumination produced by the multicolour illumination arrangement could vary in response to operation of a user input mechanism; and wherein the illumination arrangement comprises a diffuser arranged for blending light generated by the plurality of light sources.

According to a second aspect of the present invention there is provided a method for producing a varying illumination through at least part of a surface of a portable device, the device comprising a plurality of light sources, at least one of the plurality of light sources being capable of generating two or more emission colours, the method comprising driving the at least one light source such that its emission colour varies.

The user input mechanism could suitably be a control member rotatable about its axis, such that rotation of the control member by a user constitutes operation of the user input mechanism. The illumination produced by the multicolour illumination arrangement could vary in dependence upon the speed of rotation of the control member and/or could be dependent upon the orientation of the control member.

The multicolour illumination arrangement is preferably located around the control member.

Alternatively, the user input mechanism could be a keypad, and the multicolour illumination arrangement could be located beneath the keypad.

The device could conveniently be arranged to receive communications, and further arranged to vary the illumination produced by the multicolour illumination arrangement on receipt by the device of a communication. The communications receivable by the device could include at least one of: telephone calls; SMS messages; video messages; photo messages; audio messages; and emails. The illumination produced by the multicolour illumination arrangement could be dependent upon the source of a received communication.

The device could further have a calendar application for identifying a current date or time, and the device could be capable of being arranged such that the illumination produced by the multicolour illumination arrangement varies in dependence upon the current date or time.

The device could further comprise one or more sensors for sensing ambient conditions, and the device could be capable of being arranged such that the illumination produced by the multicolour illumination arrangement varies in dependence upon the sensed ambient conditions. The ambient conditions could include one or more of temperature and light intensity.

The illumination produced by the multicolour illumination arrangement may be dependent upon a current operational mode of the device.

The device could have a memory for storing one or more predefined illumination patterns, whereby a user can select a predefined pattern to be activated by the device.

The device could suitably be a radio telephone.

The surface of the illumination arrangement could be an operating fascia and/or a front fascia of the device.

The varying illumination is preferably a graduated multicolour illumination.

The at least one of the plurality of light sources is preferably a multicolour light emitting diode.

According to a third aspect of the invention there is provided an illumination arrangement comprising: a plurality of light sources, at least one of the plurality of light sources being capable of generating two or more emission colours; a sensor responsive to one or more external stimuli for generating a signal; drive means for causing the emission colour of the at least one light source to vary in response to the signal; a user input mechanism capable of varying the illumination produced by the illumination arrangement; and further comprising a diffuser arranged for blending light generated by the plurality of light sources.

The external stimuli could be ambient temperature, ambient light or electromagnetic waves, and the electromagnetic waves could have interacted with a user input key.

BRIEF DESCRIPTION OF THE DRAWINGS

The present invention will now be described by way of example with reference to the accompanying drawings, in which.

DETAILED DESCRIPTION

Figure 1:
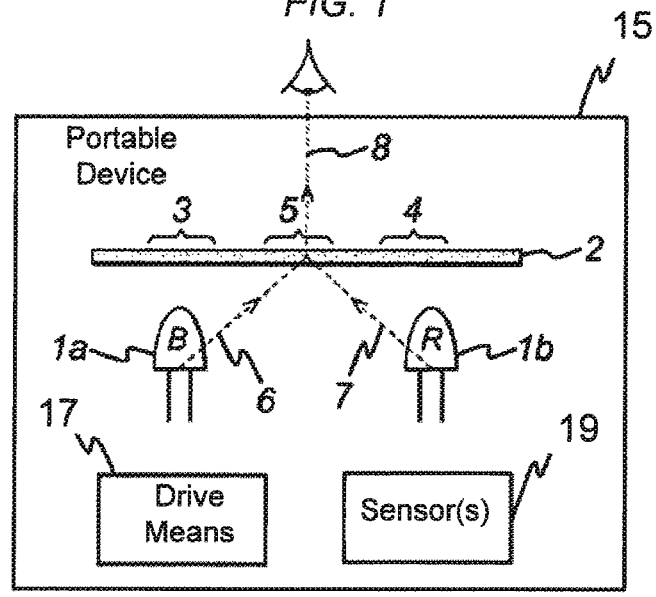
FIG. 1 shows an illumination arrangement.

FIG. 1 shows an exemplary illumination arrangement comprising light sources 1a and 1b which could, for example, be light emitting diodes. As indicated in FIG. 1, light source 1a is arranged to emit blue light, while light source 1b is arranged to emit red light. If the light sources are sufficiently large and well separated for a viewer to be able to resolve the separate light sources at the distance from which he is viewing the illumination arrangement, then, in the absence of any components modifying the light emitted by light sources 1a and 1b, the viewer would observe distinct sources of red and blue light.

A diffusion layer 2 is positioned in the viewing direction of the light sources 1a and 1b in the example shown in FIG. 1. This layer could suitably be formed of translucent plastic or of any other material that would act to diffuse light emitted by the light sources 1a and 1b. The diffuser 2 acts to blend the light emitted by the two light sources in such a way that a viewer could observe a colour consisting of a combination of red and blue light: a ray of blue light 6 emitted from light source 1a would be caused to combine with a ray of red light 7 emitted from light source 1b in the diffusion layer 2, and a resulting magenta colour would be incident on the viewer's eye. However, light rays entering the viewer's eye from parts of the diffusion layer located closer to either of the light sources would contain a stronger component of one or other of the emission colours of light sources 1a and 1b. For example, light exiting the diffusion layer 2 from the region 3 would consist mainly of blue light because more blue light than red light is incident on this region of the diffusion layer. Light emitted from the region 5 would contain roughly equal proportions of red and blue light, assuming that the intensities of the light emitted by sources 1a and 1b are roughly the same.

The diffusion layer in this embodiment therefore gives rise to an illumination whose colour varies continuously from a colour close to blue near the region 3 and a colour close to red near the region 4. It can be seen that a range of colours consisting of varying quantities of red and blue light is produced, thus giving the effect of an illumination of many colours from only two different light sources.

In an alternative embodiment, the diffusion layer 2 could be replaced by a diffuser placed between the two light sources 1a and 1b in such a way that light emitted from light source 1a in the direction of light source 1b would be diffused, and light emitted from 1b in the direction of 1a would be blended with the blue light from 1a, and combined light would be emitted in the viewing direction (as well as other directions).

The arrangement illustrated in FIG. 1 could be located within a portable device 15, and the diffusion layer could suitably be an outer surface of that device. In this way, the surface of the device would be illuminated. Alternatively, a further layer, which would preferably be light transmissive could be positioned in the viewing direction of the arrangement to enclose the illumination arrangement shown in FIG. 1.

In the arrangement shown in FIG. 1, at least one of the light sources 1a and 1b is a multicolour light source, that is, it is capable of generating two or more emission colours. Multicolour light sources such as LEDs are known to those skilled in the art of device illumination. Three-colour LEDs are well known, and these typically comprise three separate diodes, each of which can emit one of the colours red, green and blue. By mixing the light emitted from the three diodes within a single component, any colour in the visible spectrum could theoretically be achieved. However, known LEDs are only capable of emitting a limited number of colours within the spectrum. Seven-colour LEDs are also known, and these are capable of generating a larger number of emission colours. Such LEDs could suitably be applied to the present invention in order to produce a large number of overall emission colours and effects.

By driving with a drive means 17 one or more of the multicolour LEDs in an illumination arrangement such as that illustrated in FIG. 1, a varying illumination can be produced. Attractive illumination effects for a portable device are therefore possible with the use of illumination arrangements according to embodiments of the present invention.

Figure 2A:
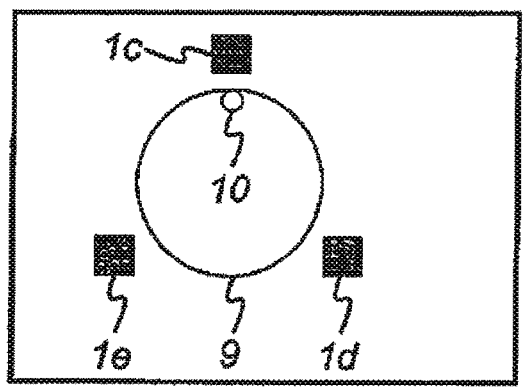
FIG. 2 shows a rotator control member in conjunction with an illumination arrangement.
Figure 2B:
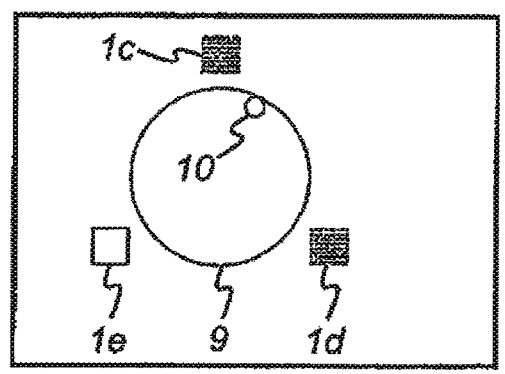

FIGS. 2A and 2B show a section of a portable device having a rotatable control member 9 which functions as a user input mechanism. In the embodiment of FIG. 2, the control member is a rotator wheel. Instead of being round, as indicated in FIG. 2, the wheel could have other shapes, for example, it could be hexagonal or octagonal.

Light sources 1c, 1d and 1e are arranged around the rotator wheel 9. These light sources are each capable of generating multiple emission colours. In the arrangement shown in FIGS. 2A and 2B, when the rotator wheel 9 is rotated by a user the emission colours of the light sources change. In FIG. 2A, the marker 10 shown on the rotator wheel 9 is vertically up. In this particular example, with the rotator in this position light source 1c is emitting green light, 1d is emitting blue light and 1e is emitting red light. In FIG. 2B, the rotator 9 has been rotated clockwise and the emission colours of each of the light sources has changed accordingly. Light source 1c is now emitting purple light, 1d is emitting yellow light and 1e is emitting white light. This is visually attractive to a user and can also be useful in assisting the user with the operation of the device. For example, the device could be arranged so that the light source 1e always emits white light when the rotator wheel is in the position indicated in FIG. 2B, that is, with the marker 10 at about 30° clockwise from vertically up. The user could then make use of the illumination from light sources 1c, 1d and 1e in determining the current orientation of the rotator wheel 9. This could be particularly useful when the device is being used in a dark room.

Figure 3:
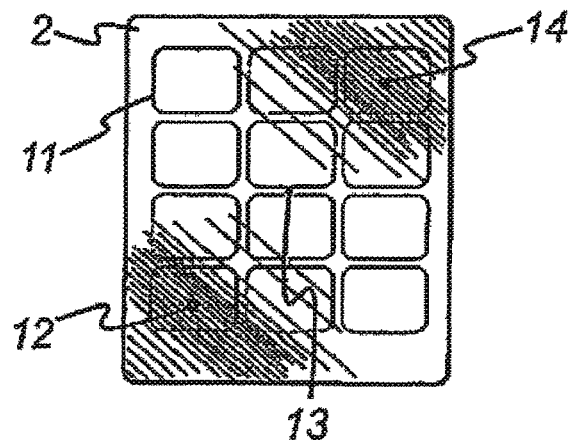
FIG. 3 shows an illuminated keypad.

FIG. 3 shows an embodiment in which a diffusion layer 2 is arranged in the region of a keypad 11 of a mobile communications device. The shading in regions in 12 and 14 of the keypad indicates an emission colour generated by light sources located beneath the diffusion layer 2 in approximately the positions indicated by reference numerals 12 and 14. In the remainder of the keypad, a different emission colour can be seen and this is due to a series of light sources located beneath the diffusion layer 2 in the unshaded area designated as 13. In the regions of the keypad between the light sources of the first type in the positions 12 and 14 and the light sources of the second type located in the unshaded region, the emission from the keypad area is due to a combination of light from sources of the first and second types. One or more of the light sources are arranged so that their emission colours vary with time, and therefore the overall illumination varies. In other words, the illumination appears different one moment from how it appeared at an earlier moment.

The arrangement shown in FIG. 3 gives rise to a graduated illumination effect. That is, there is a transition in emission colour across the keypad, from the emission colour of one light source to the emission colour of another, nearby light source. The transition could be continuous.

Embodiments such as that described in relation to FIG. 3 could be adapted so that the pattern exhibited by the illumination varies with time. Referring again to FIG. 3, the driving arrangement causing the various light sources to emit light could be adapted to change the illumination from that illustrated in FIG. 3 at one moment in time (which could, for example, be blue light in regions 12 and 14 and white light in region 13) to a different pattern at a later moment in time, such as with blue light in the top left and bottom right corners and white light in the region spanning the bottom left corner to the top right corner. The driving arrangement could suitably be set up to cause the illumination to cycle between a series of patterns.

It will be understood that the emission of light sources in embodiments of the present invention could be arranged to vary in dependence on a wide range of criteria. Some of the possibilities will be discussed below.

A portable device containing an illumination arrangement generally as described above could also have a calendar function which keeps tracks of the current time and date. The calendar function could also store details such as appointments input by a user. The light sources of the illumination arrangement could be arranged such that the illumination varies in dependence on the current date or the time, which could be an absolute time or could be relative to some arbitrary zero. The illumination arrangement could also vary in dependence on a particular appointment becoming due, so as to alert a user to the appointment.

The illumination arrangement could be adapted to vary on receipt of a communication at the device, and the illumination could also vary according to the type of communication received or the person from whom the communication is received.

The illumination arrangement could also be adapted to vary according to ambient conditions. If suitable sensors 19 were arranged in the portable device to detect ambient conditions, the illumination could vary according to the ambient temperature or the brightness of a room. For example, it may be desirable for a mobile telephone to be illuminated brightly in a dark room. Suitably, illumination settings could be adjustable by a user. Similarly, the illumination could vary in response to the detection of ambient sounds, so that it could, for example, change in response to music being played near the device.

An operational mode of the portable device could also determine the emission from the illumination arrangement. For example, if a mobile telephone were switched to "off" the light sources could be switched off, or if the telephone was in "discreet" mode, the illumination could be correspondingly dim or could have a particular setting to indicate "discreet" mode.

In one embodiment, a series of predefined settings could be selectable by a user, so that a user could choose an illumination to suit his current mood or environment.

It will be evident that any combinations of the features described above could be implemented. Specific features have been described herein in order to illustrate rather than to limit the present invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A portable device comprising:
a casing; and
a multicolour illumination arrangement comprising
a plurality of light sources, at least one of the plurality of light sources being capable of generating two or more emission colours;
drive means for causing the emission colour of the at least one light source to vary; and
a diffuser arranged for blending light generated by the plurality of light sources,
wherein the illumination arrangement can produce a varying illumination through at least part of the casing in response to operation of a user input mechanism.

2. A device as claimed in claim 1 wherein the user input mechanism is a rotatable control member, and wherein rotation of the control member by a user constitutes operation of the user input mechanism.

3. A device as claimed in claim 2 wherein the illumination produced by the multicolour illumination arrangement varies in dependence upon a speed of rotation of the control member.

4. A device as claimed in claim 2 wherein the illumination produced by the multicolour illumination arrangement is dependent upon an orientation of the control member.

5. A device as claimed in claim 2 wherein the multicolour illumination arrangement is located around the control member.

6. A device as claimed in claim 1 wherein the user input mechanism is a keypad.

7. A device as claimed in claim 6 wherein the multicolour illumination arrangement is located beneath the keypad.

8. A device as claimed in claim 1 arranged to receive communications, and further arranged to vary the illumination produced by the multicolour illumination arrangement on receipt by the device of a communication.

9. A device as claimed in claim 8 wherein the communications receivable by the device include at least one of: telephone calls; SMS messages; video messages; photo messages; audio messages; and emails.

10. A device as claimed in claim 8 wherein the illumination produced by the multicolour illumination arrangement is dependent upon a source of a received communication.

11. A device as claimed in claim 1 further comprising a calendar application for identifying a current date or time, and wherein the device is arranged such that the illumination produced by the multicolour illumination arrangement varies in dependence upon the current date or time.

12. A device as claimed in claim 1 further comprising one or more sensors for sensing ambient conditions, and wherein the device is arranged such that the illumination produced by the multicolour illumination arrangement varies in dependence upon sensed ambient conditions.

13. A device as claimed in claim 12 wherein the ambient conditions include one or more of temperature and light intensity.

14. A device as claimed in claim 1 wherein the illumination produced by the multicolour illumination arrangement is dependent upon a current operational mode of the device.

15. A device as claimed in claim 1 further comprising a memory for storing one or more predefined illumination patterns, wherein a user can select a predefined pattern to be activated by the device.

16. A device as claimed in claim 1 wherein the diffuser comprises translucent plastic.

17. A device as claimed in claim 1 wherein the device is a radio telephone.

18. A device as claimed in claim 1 wherein the said varying illumination is a graduated multicolour illumination.

19. A device as claimed in claim 1 wherein the at least one of the plurality of light sources is a multicolour light emitting diode.

20. An illumination arrangement comprising:
a plurality of light sources, at least one of the plurality of light sources being capable of generating two or more emission colours;
a sensor responsive to one or more external stimuli for generating a signal;
drive means for causing an emission colour of the at least one light source to vary in response to the signal;
a user input mechanism capable of varying illumination produced by the illumination arrangement; and
a diffuser arranged for blending light generated by the plurality of light sources.

21. An illumination arrangement as claimed in claim 20 wherein one of the external stimuli is ambient temperature.

22. An illumination arrangement as claimed in claim 20 wherein one of the external stimuli is ambient light.

23. An illumination arrangement as claimed in claim 20 wherein one of the external stimuli is electromagnetic waves.

24. An illumination arrangement as claimed in claim 23 wherein the said electromagnetic waves are electromagnetic waves that have interacted with a user input key.

25. A method for producing a varying illumination through at least part of a surface of a portable device, the device comprising a plurality of light sources, at least one of the plurality of light sources being capable of generating two or more emission colours, the method comprising driving the at least one light source such that its emission colour varies.

26. A method as claimed in claim 25 wherein the driving step is responsive to operation of a user input mechanism of the device.

27. A method as claimed in claim 26 wherein the user input mechanism is a rotatable control member.

28. A method as claimed in claim 27 wherein the driving is responsive to a speed of rotation of the control member.

29. A method as claimed in claim 27 wherein the driving is responsive to an orientation of the control member.

30. A method as claimed in claim 25 further comprising receiving at the device a communication, and the driving is responsive to the receiving step.

31. A method as claimed in claim 30 wherein the communication is at least one of: a telephone call; an SMS message; a video message; a photo message; and an audio message; an email.

32. A method as claimed in claim 30 wherein the driving is responsive to a source of the received communication.

33. A method as claimed in claim 25 wherein the device further comprises a calendar application for identifying a current date or time, and wherein the driving is responsive to the current date or time.

34. A method as claimed in claim 25 wherein the device further comprises one or more sensors and the method further comprises sensing ambient conditions, and wherein the driving is responsive to the sensed ambient conditions.

35. A method as claimed in claim 34 wherein the ambient conditions include one or more of temperature and light intensity.

36. A method as claimed in claim 25 wherein the driving is responsive to a current operational mode of the device.

37. A method as claimed in claim 25 wherein the device further comprises a memory for storing one or more predefined illumination patterns and the method further comprises receiving from a user an input indicating one of the predefined illumination patterns, and wherein the driving is responsive to the user input for activating the indicated predefined pattern.

38. A method as claimed in claim 25 wherein the varying illumination is a graduated multicolour illumination.

* * * * *